United States Patent
Yarusso et al.

(10) Patent No.: US 9,701,875 B1
(45) Date of Patent: Jul. 11, 2017

(54) ADHESIVE COMPOSITIONS AND ARTICLES, AND METHODS OF MAKING AND USING THE SAME

(71) Applicant: 3M INNOVATIVE PROPERTIES COMPANY, St. Paul, MN (US)

(72) Inventors: David J. Yarusso, Shoreview, MN (US); Thu-Van T. Tran, Maplewood, MN (US); Soyoung Kim, San Jose, CA (US); Ross E. Behling, Woodbury, MN (US); Karl E. Benson, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/981,122

(22) Filed: Dec. 28, 2015

(51) Int. Cl.
| | | |
|---|---|---|
| C08L 23/00 | (2006.01) | |
| C09J 133/08 | (2006.01) | |
| C08L 33/26 | (2006.01) | |
| C08L 23/02 | (2006.01) | |

(52) U.S. Cl.
CPC .......... *C09J 133/08* (2013.01); *C08L 23/02* (2013.01); *C08L 33/26* (2013.01); *C08L 2205/025* (2013.01); *C08L 2205/05* (2013.01)

(58) Field of Classification Search
CPC ......... C08J 133/08; C08L 23/02; C08L 33/26; C08L 2205/02; C08L 2205/025
See application file for complete search history.

(56) References Cited

U.S. PATENT DOCUMENTS

| | | | |
|---|---|---|---|
| 3,786,116 A | 1/1974 | Milkovich | |
| 3,790,533 A | 2/1974 | Samour | |
| 3,842,059 A | 10/1974 | Milkovich | |
| 4,045,517 A * | 8/1977 | Guerin et al. | C08F 265/06 524/713 |
| 4,554,324 A | 11/1985 | Husman | |
| 4,636,578 A | 1/1987 | Feinberg | |
| 5,006,582 A | 4/1991 | Mancinelli | |
| 5,225,470 A | 7/1993 | Mancinelli | |
| 5,578,683 A | 11/1996 | Koch | |
| 5,637,646 A | 6/1997 | Ellis | |
| 5,804,610 A | 9/1998 | Hamer | |
| 6,294,249 B1 | 9/2001 | Hamer | |
| 2009/0229732 A1 | 9/2009 | Determan | |
| 2011/0070434 A1* | 3/2011 | Hirose et al. | C09J 7/0217 428/355 AC |
| 2011/0178250 A1 | 7/2011 | Steelman | |
| 2012/0220714 A1* | 8/2012 | Niwa et al. | C09J 7/0217 524/555 |

FOREIGN PATENT DOCUMENTS

| | | |
|---|---|---|
| EP | 0357229 | 3/1990 |
| GB | 847 815 A | 9/1960 |
| JP | 03-243679 | 10/1991 |
| JP | 2007-326899 | 12/2007 |
| WO | WO 94/13750 | 6/1994 |
| WO | 96/26253 A1 | 8/1996 |
| WO | WO 00/77117 | 12/2000 |
| WO | WO 2009/114683 | 9/2009 |
| WO | WO 2010/111316 | 9/2010 |
| WO | WO 2010/147811 | 12/2010 |

(Continued)

OTHER PUBLICATIONS

Pocius, "Adhesion and Adhesives Technology", An Introduction, 2002, Title pages and Table of Contents, 8 pages.
Everaerts, "Cross-Linking Hot Melt Processible Acrylic Pressure-Sensitive Adhesives using Acid/Base Interaction", The Journal of Adhesion, 2006, vol. 82, No. 4, pp. 375-387.
Ito, "Syntheses Methyl Methacrylate-Stearyl Methacrylate Graft Copolymers and Characterization by Inverse Gas Chromatography", Macromolecules, 1980, vol. 13, pp. 216-221.
Yamashita, "Synthesis Amphiphilic Graftcopolymers from Polystyrene Macromonomer", Polymer Journal, 1982, vol. 14, No. 4, pp. 255-260.

(Continued)

Primary Examiner — Nathan M Nutter
(74) Attorney, Agent, or Firm — Bradford B. Wright

(57) ABSTRACT

An adhesive composition includes a first acrylic polymer preparable from first components and a second acrylic polymer. The first components comprising i) a branched first alkyl (meth)acrylate having from 4 to 22 carbon atoms, and ii) at least one of acrylic acid and methacrylic acid. The second acrylic polymer is preparable from second components comprising iii) at least one second alkyl (meth)acrylate having from 4 to 22 carbon atoms, iv) a (meth)acrylamide represented by the formula

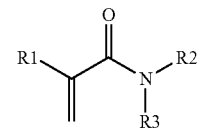

wherein $R^1$ is H or methyl, and $R^2$ and $R^3$ each independently represents H or an alkyl group having from 1 to 8 carbon atoms, or taken together $R^2$ and $R^3$ may form a divalent alkylene group having from 4 to 6 carbon atoms, and v) at least one high $T_g$ macromer having a terminal free-radically polymerizable unsaturated group, the high $T_g$ macromer having a $T_g$ of at least 45° C. Based on the combined total weight of the at least one first acrylic polymer and the at least one second acrylic polymer, the at least one second acrylic polymer is present at a level of from 5 to 40 percent by weight. Methods of making the adhesive composition are also disclosed.

6 Claims, No Drawings

(56) References Cited

FOREIGN PATENT DOCUMENTS

| | | |
|---|---|---|
| WO | WO 2011/119363 | 9/2011 |
| WO | WO 2014/078123 | 5/2014 |

OTHER PUBLICATIONS

International Search Report, PCT/US2016/067540, dated Mar. 22, 2017, 4 pages.

* cited by examiner

ADHESIVE COMPOSITIONS AND ARTICLES, AND METHODS OF MAKING AND USING THE SAME

TECHNICAL FIELD

The present disclosure broadly relates to adhesive compositions, more specifically pressure-sensitive adhesive compositions, and methods for their preparation.

BACKGROUND

Pressure-sensitive adhesives (PSAs) are used for many applications. They generally require a balance of adhesion and cohesiveness to adhere well to various types of substrates, and to remove cleanly after a long period of adhesion. One type of PSAs, hot-melt PSAs (HMPSAs), has gained popularity over the years.

According to the Pressure-Sensitive Tape Council, pressure-sensitive adhesives (PSAs) are known to possess properties including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as PSAs include polymers designed and formulated to exhibit the requisite viscoelastic properties resulting in a desired balance of tack, peel adhesion, and shear holding power. PSAs are characterized by being normally tacky at room temperature (e.g., 20° C.). Materials that are merely sticky or adhere to a surface do not constitute a PSA; the term PSA encompasses materials with additional viscoelastic properties.

These requirements for pressure-sensitive adhesives are assessed generally by means of tests which are designed to individually measure tack, adhesion (peel strength), and cohesion (shear holding power), as noted by A. V. Pocius in *Adhesion and Adhesives Technology: An Introduction, 2nd Ed.*, Hanser Gardner Publication, Cincinnati, Ohio, 2002. These measurements taken together constitute the balance of properties often used to characterize a PSA.

Hot-melt pressure-sensitive adhesives (hereinafter HMPSAs) are widely used in industry. HMPSAs are essentially 100 percent solids systems. Usually, such systems have no more than about 5 percent organic solvents or water, more typically no more than about 3 percent organic solvents or water. Among hot-melt adhesive chemistries, (meth)acrylates (i.e., methacrylates and/or acrylates) are one of the most prominent. (Meth)acrylates have evolved as a preferred class of adhesives due to their clarity, permanence of properties over time, and versatility of adhesion, to name just a few of their benefits.

Typically, acrylic HMPSAs are crosslinked in order to provide desirable shear properties, and various techniques have been used. One method of crosslinking acrylic HMPSAs involves using actinic (e.g., electromagnetic or particulate) radiation, typically ultraviolet (UV) light or electron beam. Another method involves chemical crosslinking through covalent and/or ionic bonds

SUMMARY

Advantageously the present disclosure provides for adhesive compositions with improved cohesive strength of adhesives such as, e.g., PSAs and HMPSAs without the need for a separate radiation cross-linking step. By combining a second acrylic polymer comprising one or more lower glass transition temperature (lower $T_g$) free-radically polymerizable monomer(s), a basic monomer, and a relatively higher glass transition temperature (higher $T_g$) macromer and a first acrylic polymer comprising a lower $T_g$ monomer and a (meth)acrylic acid monomer to form adhesive compositions according to the present disclosure, the cohesive strength of these adhesive compositions is greatly improved compared to that of comparable conventional adhesive compositions that require a secondary covalent cross-linking step during manufacture to build cohesive strength. Adhesive compositions (e.g., HMPSAs) according to the present disclosure achieve excellent shear strength for long periods, even at elevated temperature (e.g., 70° C.). Unexpectedly, this is achieved even though there is no or very little gel content present in adhesive compositions according to the present disclosure. In one specific embodiment, the second acrylic polymer is polymerized and then blended into the component mixture for the first acrylic polymer and is present during the polymerization of the first acrylic polymer.

In one aspect, the present disclosure provides an adhesive composition comprising:
at least one first acrylic polymer preparable by free-radical polymerization of first components comprising:
i) at least one alkyl (meth)acrylate having from 4 to 22 carbon atoms; and
ii) at least one of acrylic acid and methacrylic acid;
at least one second acrylic polymer preparable by free-radical polymerization of second components comprising:
iii) at least one alkyl (meth)acrylate having from 4 to 22 carbon atoms;
iv) at least one (meth)acrylamide represented by the formula

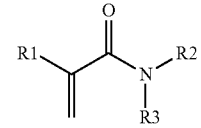

wherein $R^1$ is H or methyl; and
$R^2$ and $R^3$ independently represents H or an alkyl group having from 1 to 8 carbon atoms, or taken together $R^2$ and $R^3$ may form a divalent alkylene group having from 4 to 6 carbon atoms; and
iv) at least one high $T_g$ macromer having a terminal free-radically polymerizable unsaturated group, wherein the high $T_g$ macromer has a $T_g$ of at least 45° C.,
wherein based on the combined total weight of the at least one first acrylic polymer and the at least one second acrylic polymer, the at least one second acrylic polymer is present at a level of from 5 to 40 percent by weight.

In another aspect, the present disclosure provides a method of making an adhesive composition, the method comprising mixing at least one first acrylic polymer with at least one second acrylic polymer in the presence of organic solvent, wherein:
each first acrylic polymer is preparable by free-radical polymerization of first components comprising:
i) at least one alkyl (meth)acrylate having from 4 to 22 carbon atoms; and
ii) at least one of acrylic acid and methacrylic acid;
each second acrylic polymer is preparable by polymerization of second components comprising:

iii) at least one alkyl (meth)acrylate having from 4 to 22 carbon atoms;
iv) at least one (meth)acrylamide represented by the formula

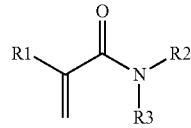

wherein $R^1$ is H or methyl; and
$R^2$ and $R^3$ independently represents H or an alkyl group having from 1 to 8 carbon atoms, or taken together $R^2$ and $R^3$ may form a divalent alkylene group having from 4 to 6 carbon atoms; and
v) at least one high $T_g$ macromer having a terminal free-radically polymerizable unsaturated group, wherein the high $T_g$ macromer has a $T_g$ of at least 45° C., wherein based on the combined total weight of the at least one first acrylic polymer and the at least one second acrylic polymer, the at least one second acrylic polymer is present at a level of from 5 to 40 percent by weight.

In yet another aspect, the present disclosure provides an adhesive composition comprising a polymerized reaction product of components comprising:
a) first components of a first acrylic polymer comprising:
  i) at least one alkyl (meth)acrylate having from 4 to 22 carbon atoms;
  ii) at least one of acrylic acid and methacrylic acid; and
b) at least one second acrylic polymer preparable by polymerization of second components comprising:
  iii) at least one alkyl (meth)acrylate having from 4 to 22 carbon atoms;
  iv) at least one (meth)acrylamide represented by the formula

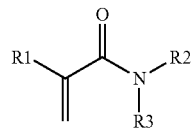

wherein $R^1$ is H or methyl; and
$R^2$ and $R^3$ independently represents H or an alkyl group having from 1 to 8 carbon atoms, or taken together $R^2$ and $R^3$ may form a divalent alkylene group having from 4 to 6 carbon atoms; and
v) at least one high $T_g$ macromer having a terminal free-radically polymerizable unsaturated group, wherein the high $T_g$ macromer has a $T_g$ of at least 45° C.; and
wherein, based on the combined total weight of the components a) and b), second acrylic polymer b) is present at a level of from 5 to 40 percent by weight.

In yet another aspect, the present disclosure provides an extrudable adhesive pouch comprising an adhesive composition according to the present disclosure sealed within a thermoplastic pouch.

In yet another aspect, the present disclosure provides a method of making an extrudable adhesive pouch, the method comprising:

providing a sealed thermoplastic pouch containing a polymerizable adhesive precursor composition comprising:
a) first components of a first acrylic polymer comprising:
  i) at least one alkyl (meth)acrylate having from 4 to 22 carbon atoms;
  ii) at least one of acrylic acid and methacrylic acid; and
b) at least one second acrylic polymer preparable by polymerization of second components comprising:
  iii) at least one alkyl (meth)acrylate having from 4 to 22 carbon atoms;
  iv) at least one (meth)acrylamide represented by the formula

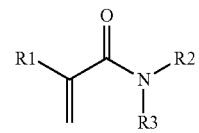

wherein $R^1$ is H or methyl; and
$R^2$ and $R^3$ independently represents H or an alkyl group having from 1 to 8 carbon atoms, or taken together $R^2$ and $R^3$ may form a divalent alkylene group having from 4 to 6 carbon atoms; and
v) at least one high $T_g$ macromer having a terminal free-radically polymerizable unsaturated group, wherein the high T macromer has a T of at least 45° C.; and
wherein, based on the combined total weight of the components a) and b), second acrylic polymer b) is present at a level of from 5 to 40 percent by weight; and
at least partially polymerizing the polymerizable adhesive precursor composition.

As used herein, the prefix "(meth)acryl" refers to acryl and/or methacryl. For example, (meth)acrylic acid refers to acrylic acid and/or methacrylic acid.

As used herein, the term "monomer" refers to a compound having at least one free-radically polymerizable group, unless otherwise specified.

As used herein, the term "preparable by" means that the subject matter can be "prepared by" the specified method, or it can be prepared according to some other method that gives the same result.

As used herein "$T_g$" refers to glass transition temperature, which can be determined by known techniques such as, for example, by differential Scanning calorimetry (DSC); for example, according to ASTM test method E1356-08 (Reapproved 2014) "Standard Test Method for Assignment of the Glass Transition Temperatures by Differential Scanning calorimetry".

Features and advantages of the present disclosure will be further understood upon consideration of the detailed description as well as the appended claims.

DETAILED DESCRIPTION

Adhesive compositions according to the present disclosure include components with acidic and basic groups that interact to provide coupling between the first and second acrylic polymers that can result in excellent shear strength over long periods, even at elevated temperature (e.g., 70° C.).

In some embodiments, the adhesive compositions comprise a mixture of at least one first acrylic polymer and at least one second acrylic polymer. Based on the combined total weight of the at least one first acrylic polymer and the at least one second acrylic polymer, the at least one second acrylic polymer is present at a level of from 5 to 40 percent by weight, preferably from 10 to 30 percent by weight, and even more preferably from 10 to 25 percent by weight.

The first acrylic polymer(s) can be prepared by free-radical polymerization of first components comprising the components: i) at least one first alkyl (meth)acrylate having from 4 to 22 carbon atoms; ii) at least one of acrylic acid and methacrylic acid. Based on the total weight of components i) and ii), the first components comprise 85 to 99 percent by weight of component i) and 1 to 15 percent by weight of component ii). In some embodiments, based on the total weight of components i) and ii), the first components comprise 90 to 99 percent by weight of component i) and 1 to 10 percent by weight of component ii), or even 95 to 99 percent by weight of component i) and 1 to 5 percent by weight of component ii).

Exemplary useful alkyl (meth)acrylates used herein have from 4 to 22 carbon atoms, preferably from 7 to 22 carbon atoms, and more preferably from 9 to 20 carbon atoms. The alkyl group may be linear or branched, and may contain one or more rings (e.g., formed of carbon and optionally one or more N, S, and/or O atoms). Exemplary suitable alkyl (meth)acrylates include n-butyl (meth)acrylate, isobutyl (meth)acrylate, pentyl (meth)acrylate, 2-methylbutyl (meth)acrylate, isoamyl (meth)acrylate, hexyl (meth)acrylate, cyclohexyl (meth)acrylate, phenyl meth(acrylate), benzyl meth(acrylate), 2-ethylhexyl (meth)acrylate, n-octyl (meth)acrylate, isooctyl (meth)acrylate, isononyl (meth)acrylate, n-nonyl (meth)acrylate, n-decyl (meth)acrylate, isodecyl (meth)acrylate, dodecyl (meth)acrylate, isobornyl (meth)acrylate, isostearyl acrylate, octadecyl (meth)acrylate, 2-methylbutyl (meth)acrylate, 4-methyl-2-pentyl (meth)acrylate, 2-ethylhexyl (meth)acrylate, 2-methylhexyl (meth)acrylate, isooctyl (meth)acrylate, 2-octyl (meth)acrylate, isononyl (meth)acrylate, isoamyl (meth)acrylate, decyl (meth)acrylate, isodecyl (meth)acrylate, dodecyl (meth)acrylate, 2-propylheptyl (meth)acrylate, isotridecyl (meth)acrylate, stearyl (meth)acrylate, isostearyl (meth)acrylate, as well as (meth)acrylic acid esters of Guerbet alcohols having 12 to 22 carbon atoms as described in PCT Pat. Appln. Publ. WO 2011/119363 A1 (Clapper et al.). The amount of alkyl (meth)acrylate is often at least 75 mole percent of the first components. For example, the first components can contain at least 80 mole percent, at least 85 mole percent, at least 90 mole percent, or at least 95 mole percent alkyl (meth)acrylate having from 4 to 22 carbon atoms based on total moles of monomer(s) in the first component mixture.

The first components are combined prior to polymerization, resulting in their incorporation into the first acrylic polymer. In the event that multiple first acrylic polymers are present, they may be made independently or simultaneously, for example.

Additional optional components may also be added prior to polymerization resulting in their incorporation in the first acrylic polymer(s). Examples of such optional components include nitrogen-free polar monomers such as 2-hydroxyethyl (meth)acrylate, 2-hydroxypropyl (meth)acrylate, and 3-hydroxypropyl (meth)acrylate. If included, these polar monomers are preferably included in an amount of less than 20 percent by weight, more preferably less than 10 percent by weight, or even less than 5 percent by weight.

The first acrylic polymer preferably has a glass transition temperature ($T_g$) no greater than 20° C., preferably no greater than 10° C., no greater than 0° C., no greater than −10° C., no greater than −20° C., no greater than −30° C., no greater than −40° C., or even no greater than −50° C.

The second acrylic polymer(s) can be prepared by free-radical polymerization of second components comprising: iii) at least one alkyl (meth)acrylate having from 4 to 22 carbon atoms; iv) at least one (meth)acrylamide represented by the Formula I (below):

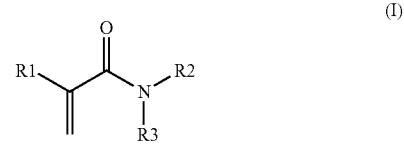

(I)

wherein $R^1$, $R^2$, and $R^3$ are as previously defined; and v) at least one high $T_g$ macromer having a terminal free-radically polymerizable unsaturated group. The high $T_g$ macromer has a $T_g$ of at least 45° C., preferably at least 60° C., at least 80° C., at least 85° C., or even at least 90° C.

The amount of alkyl (meth)acrylate having from 4 to 22 carbon atoms is often at least 35 weight percent of the components of the second acrylic polymer. For example, the components of the second acrylic polymer can contain from 35 to 95 weight percent, from 50 to 90 weight percent, or from 70 to 90 weight percent of the alkyl (meth)acrylate having from 4 to 22 carbon atoms based on the total weight of the second components.

Exemplary (meth)acrylamides represented by Formula 1 include those wherein $R^1$ represents H or methyl, and $R^2$ and $R^3$ independently represents H or an alkyl group having from 1 to 8 carbon atoms, (e.g., methyl, ethyl, propyl, isopropyl, n-butyl, iso-butyl, or tent-butyl), or taken together $R^2$ and one $R^3$ may form a divalent alkylene group having from 4 to 6 carbon atoms (e.g., ethan-1,2-diyl (i.e., —CH$_2$CH$_2$—), propan-1,3-diyl, 1,4-butan-1,4-diyl, cyclohexan-1,4-diyl). Examples of suitable (meth)acrylamides according to Formula I include (meth)acrylamide, N-methyl (meth)acrylamide, N,N-dimethyl(meth)acrylamide, N-ethyl (meth)acrylamide, N,N-dimethyl(meth)acrylamide, N-methyl-N-propyl(meth)acrylamide, N,N-dipropyl(meth) acrylamide, N-butyl(meth)acrylamide, N,N-dibutyl(meth) acrylamide, 1-(1-piperidinyl)-2-propen-1-one, and 1-(1-piperidinyl)-2-methyl-2-propen-1-one.

The amount of (meth)acrylamides according to Formula I in the second components is preferably from 1 to 25 weight percent, more preferably 1 to 15 weight percent, and even more preferably from 1 to 10 weight percent, based on the total weight of the second components.

Useful high $T_g$ macromers are polymers that have a terminal free-radically polymerizable double bond such as a vinyl group, acrylate group, or methacrylate group, and have a $T_g$ of at least 45° C., preferably at least 60° C., preferably at least 80° C., more preferably at least 90° C., or even at least 100° C. Such macromers are known, and may be prepared by the methods disclosed in U.S. Pat. No. 3,786,116 (Milkovich et al.) and U.S. Pat. No. 3,842,059 (Milkovich et al.), as well as Y. Yamashita et al., *Polymer Journal*, 1982, vol. 14, pp. 255-260, and K. Ito et al., *Macromolecules*, 1980, vol. 13, pp. 216-221. Generally, the $T_g$ of the macromer is determined by the polymer chain. In order to exhibit a desired glass transition temperature, the macromer preferably has a molecular weight of from 500 to 50000 g/mole. The polymeric portion of the macromer may comprise, e.g., atactic polymethyl methacrylate ($T_g=105°$ C.), polystyrene ($T_g=100°$ C.), polyisobornyl acrylate ($T_g=94°$ C.), polyisobornyl methacrylate ($T_g=110°$ C.), cyclohexyl methacrylate ($T_g=92°$ C.). The $T_g$ values quoted here are limiting values at high molecular weight for these polymers. In some embodiments, the high $T_g$ macromer is free of nitrogen atoms, although this is not a requirement. The high $T_g$ macromer may be a homopolymer end-capped with a polymerizable unsaturated group. Likewise, the high $T_g$ macromer may be a copolymer end-capped with a polymerizable unsaturated group, as long as its $T_g$ is sufficiently high.

Additional optional monomers may also be added to the second components prior to polymerization resulting in their incorporation in the second acrylic polymer(s). Examples of such optional monomers include polar monomers such as hydroxyalkyl (meth)acrylates (e.g., 2-hydroxyethyl (meth)acrylate, 2-hydroxypropyl (meth)acrylate, 3-hydroxypropyl (meth)acrylate, and 4-hydroxybutyl (meth)acrylate). Exemplary N-vinyl polar monomers include N-vinylcaprolactam, N-vinylacetamide, N-vinylformamide, and N-vinyl-2-pyrrolidone).

Exemplary polar monomers with an ether group include alkoxylated alkyl (meth)acrylates such as ethoxyethoxyethyl (meth)acrylate, 2-methoxyethyl (meth)acrylate, and 2-ethoxyethyl (meth)acrylate; and poly(alkylene oxide) (meth)acrylates such as poly(ethylene oxide) (meth)acrylates and poly(propylene oxide) (meth)acrylates. The poly(alkylene oxide) acrylates are often referred to as poly(alkylene glycol) (meth)acrylates. These monomers can have any suitable end group such as a hydroxyl group or an alkoxy group. For example, when the end group is a methoxy group, the monomer can be referred to as methoxy poly(ethylene glycol) (meth)acrylate.

If present, the optional polar monomer(s) can be included in an amount up to 25 weight percent based on total weight of components in the first or second components. In some embodiments, the polar monomer is present in an amount up to 20 weight percent, up to 15 weight percent, or up to 10 weight percent based on the total weight of components in the first or second components.

Any other components compatible with (e.g., miscible with) the first or second components can optionally be included in formation of the first acrylic polymer and/or the second acrylic polymer. Examples of other components include various aryl (meth)acrylate (e.g., phenyl (meth)acrylate), vinyl ethers, vinyl esters (e.g., vinyl acetate), olefinic monomers (e.g., ethylene propylene, or butylene), styrene, and styrene derivatives (e.g., alpha-methylstyrene). Still other example components are aryl substituted alkyl (meth)acrylates or alkoxy substituted alkyl (meth)acrylates such as 2-biphenylhexyl (meth)acrylate, benzyl (meth)acrylate, and 2-phenoxyethyl (meth)acrylate. In many embodiments, the (meth)acrylate is an acrylate. The mixture of first components typically does not include a monomer with multiple (meth)acryloyl groups or multiple free-radically polymerizable unsaturated groups. The relative amounts of components iii) (i.e., the alkyl (meth)acrylate), iv) (i.e., the optionally substituted (meth)acrylamide), and v) (i.e., the high $T_g$ macromer) used to form the second acrylic polymer may vary. In some preferred embodiments, the second acrylic polymer comprises 30 to 94 percent by weight of component iii), 1 to 10 percent by weight of component iv), and 5 to 60 percent by weight of component v), based on the total weight of the components iii), iv), and v). In other preferred embodiments, based on the total weight of the first and second acrylic polymers, the macromer comprises from 1 to 15 percent by weight of the first and second acrylic polymers.

Typically, the first and second acrylic polymers can be made by polymerization of the corresponding first or second components, each with a respective effective amount of a free-radical initiator system into the first and second components, although other methods such as actinic electromagnetic radiation (e.g., ultraviolet, visible light, and gamma radiation) and/or an electron beam may also be used, for example. If a thermal initiator and/or a photoinitiator is used it is generally used in at least an effective amount (e.g., from 0.01 to 10 percent by weight, preferably 0.1 to 5 percent by weight) based on the total combined weight of the first and/or second components with which it is combined, although this is not a requirement.

Useful free-radical initiator systems can include a photoinitiator and/or a thermal initiator. Suitable thermal initiators include various azo compound such as those commercially available under the trade designation VAZO from E. I. DuPont de Nemours Co. (Wilmington, Del.) including VAZO 67, which is 2,2'-azobis(2-methylbutane nitrile), VAZO 64, which is 2,2'-azobis(isobutyronitrile), VAZO 52, which is (2,2'-azobis(2,4-dimethylpentanenitrile), and VAZO 88, which is 1,1'-azobis(cyclohexanecarbonitrile); various peroxides such as benzoyl peroxide, cyclohexane peroxide, lauroyl peroxide, di-tert-amyl peroxide, tert-butyl peroxybenzoate, di-cumyl peroxide, and peroxides commercially available from Atofina Chemical, Inc. (Philadelphia, Pa.) under the trade designation LUPERSOL (e.g., LUPERSOL 101, which is 2,5-bis(tert-butylperoxy)-2,5-dimethylhexane, and LUPERSOL 130, which is 2,5-dimethyl-2,5-di-(tert-butylperoxy)-3-hexyne); various hydroperoxides such as tert-amyl hydroperoxide and tert-butyl hydroperoxide; and mixtures thereof.

In many embodiments, a photoinitiator is used. Some exemplary photoinitiators are benzoin ethers (e.g., benzoin methyl ether or benzoin isopropyl ether) or substituted benzoin ethers (e.g., anisoin methyl ether). Other exemplary photoinitiators are substituted acetophenones such as 2,2-diethoxyacetophenone or 2,2-dimethoxy-2-phenylacetophenone (commercially available under the trade designation IRGACURE 651 from BASF Corp. (Florham Park, N.J.) or under the trade designation ESACURE KB-1 from Sartomer (Exton, Pa.). Still other exemplary photoinitiators are substituted alpha-ketols such as 2-methyl-2-hydroxypropiophenone, aromatic sulfonyl chlorides such as 2-naphthalenesulfonyl chloride, and photoactive oximes such as 1-phenyl-1,2-propanedione-2-(O-ethoxycarbonyl)oxime. Other suitable photoinitiators include, for example, 1-hydroxycyclohexyl phenyl ketone (commercially available under the trade designation IRGACURE 184), bis(2,4,6-trimethylbenzoyl)phenylphosphine oxide (commercially available under the trade designation IRGACURE 819), 1-[4-(2-hydroxyethoxy)phenyl]-2-hydroxy-2-methyl-1-propane-1-one (commercially available under the trade designation IRGACURE 2959), 2-benzyl-2-dimethylamino-1-(4-morpholinophenyl)butanone (commercially available under the trade designation IRGACURE 369), 2-methyl-1-[4-(methylthio)phenyl]-2-morpholinopropan-1-one (commercially available under the trade designation IRGACURE 907), and 2-hydroxy-2-methyl-1-phenyl propan-1-one (commercially available under the trade designation DAROCUR 1173 from Ciba Specialty Chemicals Corp. (Tarrytown, N.Y.).

The first and/or second components may optionally be combined with a chain transfer agent to control the molecular weight of the resultant acrylic copolymer. Examples of useful chain transfer agents include, but are not limited to, carbon tetrabromide, alcohols (e.g., ethanol and isopropanol), mercaptans or thiols (e.g., lauryl mercaptan, butyl mercaptan, ethanethiol, isooctyl thioglycolate, 2-ethylhexyl thioglycolate, 2-ethylhexyl mercaptopropionate, ethylene glycol bisthioglycolate, and tert-dodecyl mercaptan), and mixtures thereof. If used, the polymerizable mixture may include up to 0.5 weight percent of a chain transfer agent based on a total weight of components. For example, the first reaction mixture can contain 0.005 to 0.5 weight percent, 0.01 to 0.5 weight percent, 0.01 to 0.2 weight percent, or 0.01 to 0.1 weight percent chain transfer agent.

Although any known method of making acrylic copolymers can be used, in some embodiments, it is desirable to minimize the use of organic solvents that will need to be removed later. One suitable method is to form the first (meth)acrylate within a polymeric pouch that has been purged to remove oxygen. This method, which is further described in U.S. Pat. No. 5,804,610 (Hamer et al.) and U.S. Pat. No. 6,294,249 (Hamer et al.), is particularly advantageous when the first acrylic polymer is subsequently processed using hot melt processing methods.

In this polymerization method, the various components of the reaction mixture can be sealed in a packaging material (e.g., a polymeric pouch) that does not dissolve in the presence of the first reaction mixture and that is capable of transmitting ultraviolet radiation. The packaging material is usually selected to have a melting point at or below the processing temperature of the first acrylic polymer, which is the temperature at which this material will flow. The packaging material often has a melting point no greater than 200° C., no greater than 175° C., or no greater than 150° C. The packaging material is often prepared from a flexible thermoplastic polymeric film of ethylene-vinyl acetate, ethylene-acrylic acid, polypropylene, polyethylene, polybutadiene, or ionomeric materials. The polymeric films often have a thickness of at least 0.01 millimeters, at least 0.02 millimeters, or at least 0.03 millimeters. The thickness is often up to 0.30 millimeters, up to 0.25 millimeters, up to 0.20 millimeters, up to 0.15 millimeters, or up to 0.10 millimeters. Thinner films are often desired to minimize the amount of the packaging material that is added into the adhesive composition. The amount of the packaging material is typically at least 0.5 weight percent of the total weight of the packaging material and the first reaction mixture. For example, this amount is often at least 1 weight percent, at least 2 weight percent, or even at least 3 weight percent. The amount can be up to 20 weight percent, up to 15 weight percent, up to 10 weight percent, or up to 5 weight percent based on the total weight of the packaging material and the first reaction mixture. In some embodiments, the amount is in a range of 1 to 20 weight percent, 1 to 10 weight percent, or 2 to 10 weight percent based on the total weight of the packaging material and the first reaction mixture.

The packaging material is often in the form of a polymeric pouch prepared from two lengths of thermoplastic film that are heat sealed together across the bottom and each lateral edge. The first reaction mixture is placed within the polymeric pouch and the polymeric pouch is then heat sealed across the top to completely surround the first reaction mixture. Prior to sealing the top of the polymeric pouch, it is typically desirable to remove as much air as possible. A small amount of air can be tolerated if the amount is not sufficient to substantially interfere with the polymerization reaction.

The polymerization of the first reaction mixture occurs upon exposure to UV radiation. Suitable UV sources often have at least 60 percent, at least 65 percent, at least 70 percent, or at least 75 percent of the emission spectra within the range of 280 to 400 nanometers and have an intensity within the range of 0.1 to 25 mW/cm$^2$. The temperature of the reaction mixture is often controlled by immersing the sealed polymeric pouch in a water bath or heat transfer fluid controlled at a temperature in a range of 5° C. to 50° C., in a range of 5° C. to 40° C., in a range of 5° C. to 30° C., or in a range of 5° C. to 20° C.

The first and second acrylic polymers, and any desired additional components can be combined and mixed by any suitable technique. One useful techniques is to mix the polymers in a solvent (e.g., an organic solvent), optionally with subsequent removal of at least a portion of the solvent. Examples of suitable solvents include ketones (e.g., methyl acetate, ethyl acetate, isopropyl acetate, methyl isobutyl ketone, methyl isoamyl ketone, methyl n-amyl ketone, diisobutyl ketone, and methyl n-propyl ketone), esters (e.g., n-propyl acetate, isobutyl acetate, t-butyl acetate, isobutyl isobutyrate, methoxyisopropyl acetate, ethylhexyl acetate, butoxyethyl acetate, ethoxyethoxyethyl acetate, ethylene glycol diacetate, butoxyethoxyethyl acetate, 2,2,4-trimethyl-1,3-pentanediol monoisobutyrate, and n-butyl acetate), ethers (e.g., methoxyisopropyl alcohol, propoxyethyl alcohol, 2-ethoxyethanol, tetrahydrofuran), and alcohols (e.g., butoxyethyl alcohol, 2-methoxyethoxyethyl alcohol, ethoxyethoxyethyl alcohol, propoxyethoxyethyl alcohol, butoxyethoxyethyl alcohol, 2-ethylhexoxyethyl alcohol, ethyl alcohol, isopropyl alcohol, n-propyl alcohol, isobutyl alcohol, n-butyl alcohol, and 2-ethylhexyl alcohol).

In many embodiments, the polymerization occurs with little or no organic solvent present. If used, the organic solvent is often present in an amount less than 10 weight percent, less than 5 weight percent, less than 4 weight percent, less than 3 weight percent, less than 2 weight percent, or less than 1 weight percent based on the total weight of the first reaction mixture. If used, any organic solvent typically is removed at the completion of the polymerization reaction.

The first and second acrylic polymers can be combined to form an adhesive composition wherein the at least one second acrylic polymer is present at a level of from 5 to 40 percent by weight, based on the combined total weight of the at least one first acrylic polymer and the at least one second acrylic polymer. In some embodiments, the at least one second acrylic polymer is present at a level of from 10 to 25 percent by weight, based on the combined total weight of the at least one first acrylic polymer and the at least one second acrylic polymer. In an alternative approach for making such adhesive compositions, the second acrylic polymer described above (i.e., a copolymer of alkyl (meth)acrylate, (meth)acrylamide compound, and high $T_g$ macromer) can be combined with the first components described above, and then the mixture free-radically polymerized to form the adhesive composition, for example. Free-radical polymerization can be accomplished, for example, according to the methods described hereinabove.

In addition to the first and second acrylic polymers, adhesive compositions according to the present disclosure may also include at least one tackifier. The tackifier is typically selected to be miscible with both of the first and second acrylic copolymers, although this is not a requirement. Either solid or liquid tackifiers can be added. Solid tackifiers generally have a number average molecular weight ($M_n$) of 10,000 grams per mole or less and a softening point above about 70° C. Liquid tackifiers are viscous materials that have a softening point of about 0° C. to about 70° C.

Suitable tackifying resins include rosin resins such as rosin acids and their derivatives (e.g., rosin esters); terpene resins such as polyterpenes (e.g., alpha pinene-based resins, beta pinene-based resins, and limonene-based resins) and aromatic-modified polyterpene resins (e.g., phenol modified polyterpene resins); coumarone-indene resins; and petroleum-based hydrocarbon resins such as C5-based hydrocarbon resins, C9-based hydrocarbon resins, C5/C9-based hydrocarbon resins, and dicyclopentadiene-based resins. These tackifying resins, if added, can be hydrogenated to lower their color contribution to the pressure-sensitive adhesive composition. Combinations of various tackifiers can be used, if desired. In many embodiments, the tackifier is a rosin ester or includes a rosin ester.

Tackifiers that are rosin esters are the reaction products of various rosin acids and alcohols. These include, but are not limited to, methyl esters of rosin acids, triethylene glycol esters of rosin acids, glycerol esters of rosin acids, and pentaerythritol esters of rosin acids. These rosin esters can be hydrogenated partially or fully to improve stability and reduce their color contribution to the pressure-sensitive adhesive composition. The rosin resin tackifiers are commercially available, for example, from Eastman Chemical Company (Kingsport, Tenn.) under the trade designations PERMALYN, STAYBELITE, and FORAL as well as from Newport Industries (London, England) under the trade designations NUROZ and NUTAC. A fully hydrogenated rosin resin is commercially available, for example, from Eastman Chemical Company under the trade designation FORAL AX-E. A partially hydrogenated rosin resin is commercially available, for example, from Eastman Chemical Company under the trade designation STAYBELITE-E.

Tackifiers that are hydrocarbon resins can be prepared from various petroleum-based feed stocks. These feedstocks can be aliphatic hydrocarbons (mainly C5 monomers with some other monomers present such as a mixture of trans-1,3-pentadiene, cis-1,3-pentadiene, 2-methyl-2-butene, dicyclopentadiene, cyclopentadiene, and cyclopentene), aromatic hydrocarbons (mainly C9 monomers with some other monomers present such as a mixture of vinyltoluenes, dicyclopentadiene, indene, methylstyrene, styrene, and methylindenes), or mixtures thereof. Tackifiers derived from C5 monomers are referred to as C5-based hydrocarbon resins while those derived from C9 monomers are referred to as C9-based hydrocarbon resins. Some tackifiers are derived from a mixture of C5 and C9 monomers or are a blend of C5-based hydrocarbon tackifiers and C9-based hydrocarbon tackifiers. These tackifiers can be referred to as C5/C9-based hydrocarbon tackifiers. Any of these resins can be partially or fully hydrogenated to improve their color and thermal stability.

The C5-based hydrocarbon resins are commercially available from Eastman Chemical Company under the trade designations PICCOTAC and EASTOTAC, from Cray Valley (Exton, Pa.) under the trade designation WINGTACK, from Neville Chemical Company (Pittsburgh, Pa.) under the trade designation NEVTAC LX, and from Kolon Industries, Inc. (South Korea) under the trade designation HIKOREZ. The C5-based hydrocarbon resins are commercially available from Eastman Chemical with various degrees of hydrogenation under the trade designation EASTOTACK.

The C9-based hydrocarbon resins are commercially available from Eastman Chemical Company under the trade designation PICCO, KRISTLEX, PLASTOLYN, and PICCOTAC, and ENDEX, from Cray Valley under the trade designations NORSOLENE, from Ruetgers N.V. (Belgium) under the trade designation NOVAREZ, and from Kolon Industries, Inc. (South Korea) under the trade designation HIKOTAC. These resins can be partially or fully hydrogenated. Prior to hydrogenation, the C9-based hydrocarbon resins are often about 40 percent aromatic as measured by proton Nuclear Magnetic Resonance. Hydrogenated C9-based hydrocarbon resins are commercially available, for example, from Eastman Chemical under the trade designations REGALITE and REGALREX that are 50 to 100 percent (e.g., 50 percent, 70 percent, 90 percent, and 100 percent) hydrogenated. The partially hydrogenated resins typically have some aromatic rings.

Various C5/C9-based hydrocarbon tackifiers are commercially available from Arakawa (Germany) under the trade designation ARKON, from Zeon Corporation (Japan) under the trade designation QUINTONE, from Exxon Mobile Chemical (Houston, Tex.) under the trade designation ESCOREZ, and from Newport Industries (London, England) under the trade designations NURES and H-REZ.

Any of the tackifiers may be used in an amount, preferably at least 20 weight percent based on a total weight of solids in the adhesive composition, although lower amounts may also be useful. As used herein, the term "solids" includes all materials other than water and organic solvents in the adhesive composition. The main contributors to the solids are the first and second acrylic polymers, and optional tackifier. In some embodiments, the amount of tackifier is at least 25 weight percent, at least 30 weight percent, or at least 35 weight percent based on the total weight of solids in the adhesive composition. The amount of the tackifier can be up to 60 weight percent or even higher, up to 55 weight percent, up to 50 weight percent, up to 45 weight percent, or up to 40 weight percent based on the total weight of the solids in the adhesive composition. In some embodiments, the tackifier is present in an amount in a range of 20 to 60 weight percent, in a range of 30 to 60 weight percent, in a range of 20 to 50 weight percent, in a range of 30 to 50 weight percent, in a range of 20 to 45 weight percent, or in a range of 20 to 40 weight percent based on the total weight of solids in the adhesive composition.

Further optional components can be added to the adhesive composition such as, for example, heat stabilizers, antioxidants, antistatic agents, plasticizers, thickeners, fillers, pigments, dyes, colorants, thixotropic agents, processing aides, nanoparticles, fibers, and combinations thereof. Such additives, if present, usually contribute in total less than 10 weight percent, less than 5 weight percent, less than 3 weight percent, or less than 1 weight percent to the solids of the adhesive composition.

The first acrylic polymer, the second acrylic polymer, and the optional tackifier can be blended together to form the adhesive composition. Any suitable method of blending these components together can be used. The blending method can be done in the presence or absence of an organic solvent. In many embodiments, it can be advantageous to form an adhesive composition free or substantially free of an organic solvent. As used in reference to the adhesive composition, the term "substantially free" means that the total solids of the adhesive composition is greater than 90 weight percent, greater than 95 weight percent, greater than 97 weight percent, greater than 98 weight percent, or greater than 99 weight percent based on a total weight of the adhesive composition.

In many embodiments, the blending methods include mixing the various components in a molten state. Such blending methods can be referred to as hot melt mixing methods or hot melt blending methods. Both batch and continuous mixing equipment can be used. Examples of batch methods for blending components of the adhesive composition include those using a BRABENDER (e.g., a BRABENDER PREP CENTER that is commercially available from C.W. Brabender Instruments, Inc. (South Hackensack, N.J.) or BANBURY internal mixing and roll milling equipment, which is available from Farrel Co. (Ansonia, Conn.). Examples of continuous mixing methods include single screw extruding, twin screw extruding, disk extruding, reciprocating single screw extruding, and pin barrel single screw extruding. Continuous methods can utilize distributive elements, pin mixing elements, static mixing elements, and dispersive elements such as MADDOCK mixing elements and SAXTON mixing elements.

A single piece or multiple pieces of hot melt mixing equipment may be used to prepare the adhesive compositions. In some embodiments, it may be desirable to use more than one piece of hot melt mixing equipment. For example, a first extruder such as a single screw extruder can be used to hot melt process the first acrylic polymer contained within a thermoplastic pouch. The output of the first extruder can be fed into a second extruder such as a twin screw extruder for hot melt mixing the first acrylic polymer with the second acrylic polymer, tackifier, or both.

The output of the hot melt mixing process is a blended adhesive composition. This blended adhesive composition can be applied as a coating to a substrate. If a batch apparatus is used, the hot melt blended adhesive composition can be removed from the apparatus and placed in a hot melt coater or extruder for coating onto a substrate. If an extruder is used, the hot melt blended adhesive composition can be directly extruded onto a substrate to form a coating.

The extruded adhesive composition is typically deposited on a substrate. Thus, in another aspect, an article is provided. The article includes a substrate and a coating of the adhesive composition positioned adjacent to the substrate. The adhesive composition is the same as described above and includes the first acrylic polymer, the second acrylic polymer, and the tackifier. As used herein, the term "adjacent" refers to a first layer positioned near the second layer. The first and second layers can be in contact or can be separated from each other by another layer. For example, a substrate can be positioned adjacent to the adhesive composition if the substrate contacts the adhesive composition or is separated from the adhesive composition by another layer such as a primer layer or surface modification layer that increases the adhesion of the adhesive composition to the substrate. The adhesive composition is typically applied as a coating to a major surface of the substrate and the article is a substrate coated with the adhesive composition.

Any suitable substrate can be used in the article. For example, the substrate can be flexible or inflexible and can be formed from a polymeric material, glass or ceramic material, metal, or combination thereof. Some substrates are polymeric films such as those prepared from polyolefins (e.g., polyethylene, polypropylene, or copolymers thereof), polyurethanes, polyvinyl acetates, polyvinyl chlorides, polyesters (polyethylene terephthalate or polyethylene naphthalate), polycarbonates, polymethyl(meth)acrylates (PMMA), ethylene-vinyl acetate copolymers, and cellulosic materials (e.g., cellulose acetate, cellulose triacetate, and ethyl cellulose). Other substrates are metal foils, nonwoven materials (e.g., paper, cloth, nonwoven scrims), foams (e.g., polyacrylic, polyethylene, polyurethane, neoprene), and the like. For some substrates, it may be desirable to treat the surface to improve adhesion to the crosslinked composition, crosslinked composition, or both. Such treatments include, for example, application of primer layers, surface modification layer (e.g., corona treatment or surface abrasion), or both.

In some embodiments, the substrate is a release liner. Release liners typically have low affinity for the adhesive composition or crosslinked composition. Exemplary release liners can be prepared from paper (e.g., Kraft paper) or other types of polymeric material. Some release liners are coated with an outer layer of a release agent such as a silicone-containing material or a fluorocarbon-containing material.

The adhesive composition coating can have any desired thickness. In many embodiments, the adhesive composition coating has a thickness no greater than 20 mils (500 micrometers), no greater than 10 mils (250 micrometers), no greater than 5 mils (125 micrometers), no greater than 4 mils (100 micrometers), no greater than 3 mils (75 micrometers), or no greater than 2 mils (50 micrometers). The thickness is often at least 0.5 mils (12.5 micrometers) or at least 1 mil (25 micrometers). For example, the thickness of the adhesive composition coating can be in the range of 0.5 mils (2.5 micrometers) to 20 mils (500 micrometers), in the range of 0.5 mils (5 micrometers) to 10 mils (250 micrometers), in the range of 0.5 mils (12.5 micrometers) to 5 mils (125 micrometers), in the range of 1 mil (25 micrometers) to 3 mils (75 micrometers), or in the range of 1 mil (25 micrometers) to 2 mils (50 micrometers).

Articles with a coating of the adhesive composition have a pressure-sensitive adhesive layer and can be used for many applications typical of such articles. The substrate adjacent to the pressure-sensitive layer can be selected depending on the particular application. For example, the substrate can be a sheeting material and the resulting article can provide decorative graphics or can be a reflective product. In other examples, the substrate can be label stock (the resulting article is a label with an adhesive layer) or tape backing (the resulting article is an adhesive tape). In yet other examples, the substrate can be a release liner and the resulting article can be a transfer tape. The transfer tape can be used to transfer the pressure-sensitive adhesive layer to another substrate or surface. Other substrates and surface include, for example, a panel (e.g., a metal panel such as an automotive panel) or a glass window.

Some articles are adhesive tapes. The adhesive tapes can be single-sided adhesive tapes with the adhesive composition attached to a single side of the tape backing or can be double-sided adhesive tape with a pressure-sensitive adhesive layer on both major surfaces of the tape backing. At least one of the two pressure-sensitive adhesive layers is the adhesive composition described above. Double-sided adhesive tapes are often carried on a release liner.

SELECT EMBODIMENTS OF THE PRESENT DISCLOSURE

In a first embodiment, the present disclosure provides an adhesive composition comprising:
at least one first acrylic polymer preparable by free-radical polymerization of first components comprising:
i) at least one alkyl (meth)acrylate having from 4 to 22 carbon atoms; and
ii) at least one of acrylic acid and methacrylic acid;
at least one second acrylic polymer preparable by free-radical polymerization of second components comprising:
iii) at least one alkyl (meth)acrylate having from 4 to 22 carbon atoms;
iv) at least one (meth)acrylamide represented by the formula

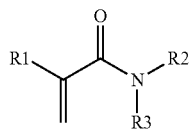

wherein R¹ is H or methyl; and
R² and R³ independently represents H or an alkyl group having from 1 to 8 carbon atoms, or taken together R² and R³ may form a divalent alkylene group having from 4 to 6 carbon atoms; and
v) at least one high $T_g$ macromer having a terminal free-radically polymerizable unsaturated group, wherein the high $T_g$ macromer has a $T_g$ of at least 45° C., wherein based on the combined total weight of the at least one first acrylic polymer and the at least one second acrylic polymer, the at least one second acrylic polymer is present at a level of from 5 to 40 percent by weight.

In a second embodiment, the present disclosure provides an adhesive composition according to the first embodiment, wherein the high $T_g$ macromer has a $T_g$ of at least 80° C.

In a third embodiment, the present disclosure provides an adhesive composition according to the first or second embodiment, wherein the at least one high $T_g$ macromer comprises a polymethyl methacrylate macromer having a terminal free-radically polymerizable unsaturated group.

In a fourth embodiment, the present disclosure provides an adhesive composition according to any one of the first to third embodiments, wherein based on the total weight of components i) and ii), the first acrylic polymer comprises:
85 to 99 percent by weight of first component i); and
1 to 15 percent by weight of first component ii).

In a fifth embodiment, the present disclosure provides an adhesive composition according to any one of the first to fourth embodiments, wherein based on the total weight of the components iii), iv), and v), the second acrylic polymer comprises:
30 to 94 percent by weight of second component iii);
1 to 10 percent by weight of second component iv); and
5 to 60 percent by weight of second component v).

In a sixth embodiment, the present disclosure provides an adhesive composition according to any one of the first to fifth embodiments, wherein based on the combined total weight of the at least one first acrylic polymer and the at least one second acrylic polymer, the second acrylic polymer comprises from 5 to 40 percent by weight.

In a seventh embodiment, the present disclosure provides an adhesive composition according to any one of the first to fifth embodiments, wherein the polymerizable adhesive precursor composition further comprises at least one of a tackifier and a plasticizer.

In an eighth embodiment, the present disclosure provides a method of making an adhesive composition, the method comprising mixing at least one first acrylic polymer with at least one second acrylic polymer in the presence of organic solvent, wherein:
each first acrylic polymer is preparable by free-radical polymerization of first components comprising:
i) at least one alkyl (meth)acrylate having from 4 to 22 carbon atoms; and
ii) at least one of acrylic acid and methacrylic acid;
each second acrylic polymer is preparable by polymerization of second components comprising:
iii) at least one alkyl (meth)acrylate having from 4 to 22 carbon atoms;
iv) at least one (meth)acrylamide represented by the formula

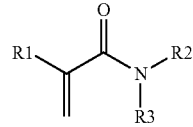

wherein R¹ is H or methyl; and
R² and R³ independently represents H or an alkyl group having from 1 to 8 carbon atoms, or taken together R² and R³ may form a divalent alkylene group having from 4 to 6 carbon atoms; and
v) at least one high $T_g$ macromer having a terminal free-radically polymerizable unsaturated group, wherein the high $T_g$ macromer has a $T_g$ of at least 45° C., wherein based on the combined total weight of the at least one first acrylic polymer and the at least one second acrylic polymer, the at least one second acrylic polymer is present at a level of from 5 to 40 percent by weight.

In a ninth embodiment, the present disclosure provides an adhesive composition comprising a polymerized reaction product of components comprising:
a) first components of a first acrylic polymer comprising:
i) at least one alkyl (meth)acrylate having from 4 to 22 carbon atoms;
ii) at least one of acrylic acid and methacrylic acid;
b) at least one second acrylic polymer preparable by polymerization of second components comprising:
iii) at least one alkyl (meth)acrylate having from 4 to 22 carbon atoms;
iv) at least one (meth)acrylamide represented by the formula

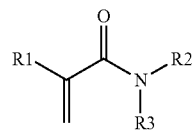

wherein R¹ is H or methyl; and
R² and R³ independently represents H or an alkyl group having from 1 to 8 carbon atoms, or taken together R² and R³ may form a divalent alkylene group having from 4 to 6 carbon atoms; and
v) at least one high $T_g$ macromer having a terminal free-radically polymerizable unsaturated group, wherein the high $T_g$ macromer has a $T_g$ of at least 45° C.; and wherein, based on the combined total weight of the components a) and b), second acrylic polymer b) is present at a level of from 5 to 40 percent by weight.

In a tenth embodiment, the present disclosure provides an adhesive composition according to the ninth embodiment, wherein the high $T_g$ macromer has a $T_g$ of at least 80° C.

In an eleventh embodiment, the present disclosure provides an adhesive composition according to the ninth or tenth embodiment, wherein the at least one high $T_g$ macromer comprises a polymethyl methacrylate macromer having a terminal free-radically polymerizable unsaturated group.

In a twelfth embodiment, the present disclosure provides an adhesive composition according to any one of the ninth to eleventh embodiments, wherein based on the total weight of components i) and ii), the first components comprise:
 85 to 99 percent by weight of first component i); and
 1 to 15 percent by weight of first component ii).

In a thirteenth embodiment, the present disclosure provides an adhesive composition according to any one of the ninth to twelfth embodiments, wherein based on the total weight of the components iii), iv), and v), the second acrylic polymer comprises:
 30 to 94 percent by weight of second component iii);
 1 to 10 percent by weight of second component iv); and
 5 to 60 percent by weight of second component v).

In a fourteenth embodiment, the present disclosure provides an adhesive composition according to any one of the ninth to thirteenth embodiments, further comprising at least one of a tackifier and a plasticizer.

In a fifteenth embodiment, the present disclosure provides an extrudable adhesive pouch comprising the adhesive composition according to any one of the ninth to fourteenth embodiments, sealed within a thermoplastic pouch.

In a sixteenth embodiment, the present disclosure provides an adhesive pouch according to the fifteenth embodiment, wherein the thermoplastic pouch comprises an ethylene-vinyl acetate copolymer.

In a seventeenth embodiment, the present disclosure provides a method of making an extrudable adhesive pouch, the method comprising:
 providing a sealed thermoplastic pouch containing a polymerizable adhesive precursor composition comprising:
  a) first components of a first acrylic polymer comprising:
   i) at least one alkyl (meth)acrylate having from 4 to 22 carbon atoms;
   ii) at least one of acrylic acid and methacrylic acid; and
  b) at least one second acrylic polymer preparable by polymerization of second components comprising:
   iii) at least one alkyl (meth)acrylate having from 4 to 22 carbon atoms;
   iv) at least one (meth)acrylamide represented by the formula

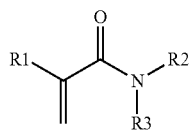

wherein $R^1$ is H or methyl; and
   $R^2$ and $R^3$ independently represents H or an alkyl group having from 1 to 8 carbon atoms, or taken together $R^2$ and $R^3$ may form a divalent alkylene group having from 4 to 6 carbon atoms; and
   v) at least one high $T_g$ macromer having a terminal free-radically polymerizable unsaturated group, wherein the high $T_g$ macromer has a T of at least 45° C.; and
  wherein, based on the combined total weight of the components a) and b), second acrylic polymer b) is present at a level of from 5 to 40 percent by weight; and at least partially polymerizing the polymerizable adhesive precursor composition.

In an eighteenth embodiment, the present disclosure provides a method according to the seventeenth embodiment, wherein the high $T_g$ macromer has a $T_g$ of at least 80° C.

In a nineteenth embodiment, the present disclosure provides a method according to the seventeenth or eighteenth embodiment, wherein the at least one high $T_g$ macromer comprises a polymethyl methacrylate macromer having a terminal free-radically polymerizable unsaturated group.

In a twentieth embodiment, the present disclosure provides a method according to any one of the seventeenth to nineteenth embodiments, wherein based on the total weight of components i) and ii), the first components comprise:
 85 to 99 percent by weight of first component i); and
 1 to 15 percent by weight of first component ii).

In a twenty-first embodiment, the present disclosure provides a method according to any one of the seventeenth to twentieth embodiments, wherein based on the total weight of the components iii), iv), and v), the second acrylic polymer comprises:
 35 to 90 percent by weight of second component iii);
 1 to 10 percent by weight of second component iv); and
 5 to 60 percent by weight of second component v).

In a twenty-second embodiment, the present disclosure provides a method according to any one of the seventeenth to twenty-first embodiments, wherein the thermoplastic pouch comprises an ethylene-vinyl acetate copolymer.

In a twenty-third embodiment, the present disclosure provides a method according to any one of the seventeenth to twenty-second embodiments, wherein the polymerizable adhesive precursor composition further comprises at least one of a tackifier and a plasticizer.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight.

Test Methods:
Adhesion Test (180 Degree Peel Strength Test Method)
The adhesive tape was cut into 6 inches (15.2 cm) long by 0.5 inch (1.3 cm) wide strips, which were individually applied onto testing substrate stainless steel using a 2 kg rubber roller at 12 inches/min (30.5 cm/min). The sample was aged overnight in a constant temperature and humidity (CTH) chamber at 23° C. and 50% relative humidity (RH) before testing. Peel strength measurements were made using a force testing apparatus in 180 degree peel mode at 12 inches/min 30.5 cm/min). Data were recorded as an average of three measurements.

Static Shear Test
Following ASTM Designation: D3654/D3654M-06 (2006) "Standard Test Methods for Shear Adhesion of Pressure-Sensitive Tapes", a 0.5 inch wide (1.3 cm) strip of adhesive was laminated onto a stainless steel panel using 4.5 lb roller, covering a 0.5 inch (1.3 cm) by 1 inch (2.5 cm) area of the panel. A 1 kg weight was used as the static load, and the test samples were placed on an automatic timing apparatus in a CTH chamber conditioned at 23° C./50% RH, and then heated in an oven at 70° C.

Gel Measurement Test

A pre-weighed sample of adhesive was soaked in ethyl acetate overnight. The solution was filtered through a fine mesh screen. A retained portion was dried and weighed. The gel content was calculated as the ratio of retained sample to original sample.

Melt Mixing and Hot Press Method (Lab Scale)

The materials with total weight of about 25 grams were mixed in a Brabender mixer at a temperature of 160° C. for 3 minutes at a mixer speed of 50 rpm. The blend was then pressed for 1 minute in a heated platen press with platen temperature of 160° C. between with Mitsubishi 3SAB PET polyester film (50 microns thick) on one side (primed side against the adhesive) and a silicone-coated release liner on the other side.

Glass Transition Temperature Analysis of Macromonomers Test

Approximately 10 mg of each macromer sample was placed in the base of a Tzero pan, a matching Tzero lid was gently placed on top of the sample and then the lid/base pair was sealed with a Tzero press from TA Instruments (New Castle, Del.). An empty reference pan was also prepared, press sealed, and used for a reference for all samples. Samples were transferred by a mechanical arm onto the sample posts in a standard differential scanning calorimeter (DSC, TA Instruments) along with the empty reference pan on the opposite post. The temperature was dropped from room temperature (approximately 20° C.) to the starting temperature of 0° C. The sample was then heated cycled at 10° C. per minute up to 150° C. (step 1), cooled back to 0° C. at 10° C. per minute (step 2), and once again heated to up to 150° C. at 10° C. per minute (step 3). Glass transition temperatures ($T_g$) were measured on the $3^{rd}$ step so that all sample received identical thermal history prior to the measurement. The $T_g$ were identified by analysis of the scanning profile of heat flow versus temperature. The $T_g$ is generally represented by a shift in the profile slope upon heating as the heat capacity of the sample after the transition is altered. The onset T is recorded as the inflection point of the curve associated with this shift in heat flow profile at the low temperature end of the shift. The sample $T_g$ values were measured using TA Orchestrator software available from TA Instruments. The onset T values are reported in Table 2, below.

Molecular Weight Measurement by Gel Permeation Chromatography (GPC)

Samples were prepared and tested in duplicate. 10 mL of stabilized tetrahydrofuran (THF) was added to an appropriate mass of each sample to give a solution of approximately 0.25% w/v concentration. The solutions were swirled for at least 14 hours and then filtered using 0.2 micron PTFE syringe filters.

GPC analysis was conducted using the equipment and conditions reported in Table 1, below.

TABLE 1

| Instrument | Agilent 1100 |
| --- | --- |
| Column set | Jordi Gel DVB Mixed Bed, 250 × 10 mm I.D. |
| Column Heater | 40° C. |
| Eluent | THF stabilized with 250 ppm BHT at 1.0 mL/min |
| Injection | 30 microliters |
| Detector | Differential refractive index (DRI) |

Molecular weights were determined from elution volume by comparison to polystyrene standards. Number average and weight average molecular weights were determined by appropriate weighted integrals of the curve by standard methods.

Macromers Used

Four different macromers of varying molecular weight were used. All were obtained from Lucite Corporation or ICI (former supplier of Elvacite materials). All were identified as Elvacite 1010 or 1020, but various lots were found to have different molecular weights, so the materials will be identified herein by the following names corresponding to their measured weight average molecular weight ($M_w$) and polydispersity defined by the ratio of $M_w$ to the number average molecular weight, $M_n$ as reported in Table 2, below.

TABLE 2

| MACROMER | $M_w$, kDaltons | POLYDISPERSITY, $M_w/M_n$ | ONSET $T_g$, ° C. |
| --- | --- | --- | --- |
| Mac1 | 4.1 | 2.3 | 48.5 |
| Mac2 | 8.5 | 1.9 | not tested |
| Mac3 | 13.7 | 2.4 | 83.3 |
| Mac4 | 25.3 | 4.5 | 97.6 |

TABLE 3

| MATERIAL | SUPPLIER | ABBREVIATION |
| --- | --- | --- |
| 2-ethyl hexyl acrylate | BASF | 2EHA |
| acrylic acid | Aldrich Chemical Co. | AA |
| acrylamide | Aldrich Chemical Co. | ACM |
| 2-octyl acrylate | Parchem | 2OA |
| n-butyl acrylate | Aldrich Chemical Co. | nBA |
| Vazo 67 | DuPont | |
| Irgacure 651 | Sartomer | |
| ethyl acetate | Aldrich Chemical Co. | EtOAc |
| isopropanol | Aldrich Chemical Co. | IPA |
| isooctyl thioglycolate | Aldrich Chemical Co. | IOTG |
| Irganox 1076 | Ciba Specialty Chemicals | |

Preparation of Second Acrylic Polymers by Solution Polymerization

The second components, solvent, and initiator were charged to 120 ml amber glass bottles, purged with nitrogen gas at 1.5 L/min for a minimum of 60 seconds to remove oxygen before being sealed with a Teflon lined plastic cap. The sealed bottles were then mounted into a Launder-Ometer washing machine in which they were immersed in water which was heated to 60° C. with mechanical rotation during polymerization which turns the bottles end-over-end. The reaction was allowed to proceed for 24 hours before being removed from the Launder-Ometer washing machine. Bottle contents were poured onto a silicone release liner that was placed inside of aluminum trays such that the solution thickness was a few millimeters. Adhesive solution was allowed to dry at room temperature for 3-4 days, flipping the sample over each day until no further solvent odor was detected. Each batch contained a total of 35 g of all ingredients combined and the ingredients were present in the following ratios based on mass as reported in Table 4, below.

TABLE 4

| MATERIALS | PARTS BY WEIGHT |
|---|---|
| second components | 100 |
| ethyl acetate | 116 |
| isopropyl alcohol | 6.1 |
| Vazo67 (initiator) | 0.05 |

The monomer compositions of the second acrylic polymers prepared are summarized in the following table for a set of materials containing 2-ethyl hexyl acrylate (2EHA), acrylamide (ACM), and macromer (Mac). The measured weight average molecular weight is reported in Table 5, below.

TABLE 5

| Polymer2 | 2EHA, % | ACM, % | Mac, % | Mac used | $M_w$, kDaltons |
|---|---|---|---|---|---|
| P2-1 | 95 | 5 | 0 | NA | 239 |
| P2-2 | 94.5 | 5.5 | 0 | NA | 253 |
| P2-3 | 94.5 | 5.5 | 0 | NA | 257 |
| P2-4 | 90 | 5 | 5 | Mac1 | 143 |
| P2-5 | 85 | 5 | 10 | Mac1 | 101 |
| P2-6 | 80 | 5 | 15 | Mac1 | 75 |
| P2-7 | 75 | 5 | 20 | Mac1 | 54 |
| P2-8 | 70 | 5 | 25 | Mac1 | 40 |
| P2-9 | 65 | 5 | 30 | Mac1 | 28 |
| P2-10 | 60 | 5 | 35 | Mac1 | 23 |
| P2-11 | 55 | 5 | 40 | Mac1 | 17 |
| P2-12 | 45 | 5 | 50 | Mac1 | 9 |
| P2-13 | 35 | 5 | 60 | Mac1 | 7 |
| P2-14 | 79.5 | 8 | 12.5 | Mac1 | not measured |
| P2-15 | 75 | 0 | 25 | Mac1 | 33 |
| P2-16 | 90 | 5 | 5 | Mac2 | 184 |
| P2-17 | 80 | 5 | 15 | Mac2 | 124 |
| P2-18 | 70 | 5 | 25 | Mac2 | 88 |
| P2-19 | 85 | 5 | 10 | Mac2 | 158 |
| P2-20 | 75 | 5 | 20 | Mac2 | 112 |
| P2-21 | 65 | 5 | 30 | Mac2 | 72 |
| P2-22 | 90 | 5 | 5 | Mac3 | 183 |
| P2-23 | 85 | 5 | 10 | Mac3 | 148 |
| P2-24 | 75 | 5 | 20 | Mac3 | 108 |
| P2-25 | 70 | 5 | 25 | Mac3 | 138 |
| P2-26 | 65 | 5 | 30 | Mac3 | 82 |
| P2-27 | 91 | 4 | 5 | Mac3 | 179 |
| P2-28 | 88 | 7 | 5 | Mac3 | 191 |
| P2-29 | 82 | 5.5 | 12.5 | Mac3 | 136 |
| P2-30 | 79.5 | 8 | 12.5 | Mac3 | 170 |
| P2-31 | 76 | 4 | 20 | Mac3 | 106 |
| P2-32 | 73 | 7 | 20 | Mac3 | 116 |
| P2-33 | 90 | 5 | 5 | Mac4 | 205 |
| P2-34 | 85 | 5 | 10 | Mac4 | 180 |
| P2-35 | 75 | 5 | 20 | Mac4 | 144 |
| P2-36 | 65 | 5 | 30 | Mac4 | 121 |
| P2-37 | 82 | 5.5 | 12.5 | Mac4 | 142 |
| P2-38 | 79.5 | 8 | 12.5 | Mac4 | 254 |
| P2-39 | 73 | 7 | 20 | Mac4 | 198 |
| P2-40 | 70 | 5 | 25 | Mac4 | 131 |
| P2-41 | 69.4 | 5.5 | 25.1 | Mac4 | 142 |

Two more polymers were prepared using n-vinyl-2-pyrrolidone (NVP) or N,N-dimethylacrylamide (NNDMA). Results are reported in Table 6, below.

TABLE 6

| Polymer2 | 2EHA, % | NVP, % | NNDMA, % | Mac, % | Mac used |
|---|---|---|---|---|---|
| P2-42 | 79.5 | 8 | 0 | 12.5 | Mac3 |
| P2-43 | 79.5 | 0 | 8 | 12.5 | Mac3 |

Preparation of Second Acrylic Polymers by Bulk Polymerization

Second acrylic polymers in Table 7, below, were prepared according to the method described in U.S. Pat. No. 5,637,646 (Ellis).

TABLE 7

| Polymer2 | 2EHA, % | ACM, % | Mac, % | Mac used | $M_w$, kDaltons |
|---|---|---|---|---|---|
| P2-44 | 90 | 7 | 3 | Mac1 | 122 |
| P2-45 | 70 | 5 | 25 | Mac1 | 45 |

Preparation of First Acrylic Polymer by Solution Polymerization

A first acrylic polymer was prepared as described above for preparation of the second acrylic polymer by solution polymerization, except with a larger batch size comprising 250 g of combined ingredients and the polymerization was conducted in a 1-liter bottle. The ingredients were present in amounts as reported in Table 8, below.

TABLE 8

| MATERIALS | PARTS BY WEIGHT |
|---|---|
| first components | 100 |
| ethyl acetate | 150 |
| IOTG (chain transfer agent) | 0.04 |
| Vazo67 (initiator) | 0.05 |

The monomer composition and molecular weight for this polymer is reported in Table 9, below.

TABLE 9

| Polymer1 | 2EHA, % | AA, % | $M_w$, kDaltons |
|---|---|---|---|
| P1-1 | 95 | 5 | 312 |

These polymer solutions were not dried before use.

Preparation of Adhesive Compositions by Solution Blending

For each of the following compositions, a dried second acrylic polymer as described above was dissolved in a portion of the first acrylic polymer solution P1-1 in a glass jar. Additional ethyl acetate was added to obtain a final solids content (i.e. non-volatile components) of about 25%. The mixture was allowed to mix on a roller until homogeneous. The mixture was then coated on a sample of 50 μm thick primed polyester film (Mitsubishi 3 SAB) using a knife coater with a gap set to yield a dry coating thickness of about 50 p.m. The coated sample was dried in a forced air oven at 70° C. for 10 minutes to evaporate the solvent. The samples were conditioned in a controlled temperature and humidity (CTH) room at 23.4° C. and 50% relative humidity overnight prior to testing. The compositions prepared and their performance test results are reported in Table 10.

Preparation of Adhesive Compositions by Polymerization of First Acrylic Polymer in Presence of Second Acrylic Polymer For these compositions, the second acrylic polymer was dissolved in the component mixture for preparation of the first acrylic polymer. That mixture was sealed in a clear polymer package and polymerized in bulk, using ultraviolet light to initiate the polymerization according to the method described in U.S. Pat. No. 5,804,610 (Hamer et al.). For samples E-40 and E-41, the monomer mixture also contained 0.10 pph Irgacure 651 (photoinitiator), 0.02 pph IOTG (chain transfer agent), and 0.40 pph Irganox 1076 (antioxidant) where the pph represents parts per hundred parts of monomer. For all the others, the monomer mixture also contained 0.15 pph Irgacure 651 and 0.02 pph IOTG and no antioxidant. After polymerization, tape samples were prepared by the Melt Mixing and Hot Press method described above. The compositions prepared and their performance test results are reported in Table 11.

TABLE 10

| ID | Polymer2 | Polymer2, % | Overall Mac. % | 180° Peel Adhesion. N/cm | Adhesion. Failure mode | Shear (23° C.), min | Shear Failure mode (23° C.) | Shear (70° C.), min | Shear Failure mode 70° C. |
|---|---|---|---|---|---|---|---|---|---|
| C-7 | None | 0 | 0 | 20.4 | cohesive | 2 | cohesive | 0 | cohesive |
| C-8 | P2-3 | 40 | 0 | 7.8 | adhesive | 22 | cohesive | 2 | cohesive |
| E-42 | P2-14 | 30 | 3.75 | 10.4 | adhesive | 200 | cohesive | 7 | cohesive |
| E-43 | P2-14 | 40 | 5 | 7.6 | adhesive | 1581 | cohesive | 13 | cohesive |
| E-44 | P2-8 | 30 | 7.5 | 9.3 | adhesive | 140 | cohesive | 6 | cohesive |
| E-45 | P2-8 | 40 | 10 | 9.9 | adhesive | 988 | cohesive | 6 | cohesive |
| E-46 | P2-10 | 30 | 10.5 | 14.8 | adhesive | 62 | cohesive | 2 | cohesive |
| E-47 | P2-10 | 40 | 14 | 9.2 | adhesive | 271 | cohesive | 4 | cohesive |
| E-48 | P2-30 | 30 | 3.75 | 7.7 | adhesive | 7652 | cohesive | 373 | cohesive |
| E-49 | P2-32 | 30 | 6 | 6.8 | adhesive | ≥10000 | cohesive | 402 | cohesive |
| E-50 | P2-25 | 30 | 7.5 | 6.4 | adhesive | 2423 | cohesive | 397 | cohesive |
| E-51 | P2-38 | 30 | 3.75 | 5.9 | adhesive | 4966 | cohesive | 265 | cohesive |
| E-52 | P2-39 | 30 | 6 | 7.2 | adhesive | 4776 | cohesive | 241 | cohesive |
| E-53 | P2-40 | 30 | 7 5 | 6.9 | adhesive | 6151 | cohesive | 495 | cohesive |
| C-9 | P2-42 | 30 | 3.75 | 18.7 | cohesive | 908 | cohesive | 13 | cohesive |
| C-10 | P2-43 | 30 | 3 75 | 17.2 | cohesive | 182 | cohesive | 8 | cohesive |

TABLE 11

| ID | Polymer2 | Polymer2, % | Overall Mac. % | Polymer1 components | Polymer1 component Ratios | 180° Peel Adhesion, N/cm | Shear (23° C.), min | Shear Failure mode (23° C.) | Shear (70° C.), min | Shear Failure mode 70° C. |
|---|---|---|---|---|---|---|---|---|---|---|
| C-1 |  | 0 | 0 | 2-OA/AA | 90/10 | 7.0 | 211 | cohesive | 11 | cohesive |
| C-2 |  | 0 | 0 | 2-EHA/AA | 95/5 | 9.2 | 3 | cohesive | 1 | cohesive |
| C-3 |  | 0 | 0 | 2-OA/AA | 95/5 | 4.0 | 15 | cohesive | 2 | cohesive |
| E-1 | P2-6 | 20 | 3 | 2-OA/AA | 90/10 | 7.6 | ≥10000 |  | 96 | cohesive |
| E-2 | P2-4 | 25 | 1.25 | 2-OA/AA | 90/10 | 7.3 | 1239 | cohesive | 36 | cohesive |
| E-3 | P2-5 | 25 | 2.5 | 2-OA/AA | 90/10 | 7.2 | 8404 | cohesive | 63 | cohesive |
| E-4 | P2-7 | 25 | 5 | 2-OA/AA | 90/10 | 6.4 | ≥10000 |  | 429 | cohesive |
| E-5 | P2-9 | 25 | 7.5 | 2-OA/AA | 90/10 | 6.5 | ≥10000 |  | 1369 | cohesive |
| E-6 | P2-11 | 25 | 10 | 2-OA/AA | 90/10 | 4.5 | ≥10000 |  | 1960 | cohesive |
| E-7 | P2-12 | 25 | 1.25 | 2-OA/AA | 90/10 | 6.6 | ≥10000 |  | 269 | cohesive |
| E-8 | P2-13 | 25 | 15 | 2-OA/AA | 90/10 | 6.2 | ≥10000 |  | 35 | cohesive |
| C-4 |  | 25 | 0 | 2-EHA/AA | 95/5 | 6.5 | 22 | cohesive | 2 | cohesive |
| E-9 | P2-5 | 25 | 2.5 | 2-EHA/AA | 95/5 | 6.8 | 320 | cohesive | 13 | cohesive |
| E-10 | P2-7 | 25 | 5 | 2-EHA/AA | 95/5 | 6.4 | ≥10000 |  | 237 | cohesive |
| E-11 | P2-9 | 25 | 7.5 | 2-EHA/AA | 95/5 | 6.0 | ≥10000 |  | 2998 | cohesive |
| C-5 |  | 25 | 6.25 | 2-EHAMA | 95/5 | 5.9 | 2090 |  | 121 |  |
| E-12 | P2-16 | 30 | 1 5 | 2-OA/AA | 95 5 | 3.9 | 320 | cohesive | 10 | cohesive |
| E-13 | P2-17 | 30 | 4.5 | 2-OA/AA | 95/5 | 2.8 | 6164 | cohesive | 270 | cohesive |
| E-14 | P2-18 | 30 | 7.5 | 2-OA/AA | 95/5 | 2.2 | 8607 | cohesive | 523 | cohesive |
| E-15 | P2-16 | 30 | 15 | 2-OA/AA | 90/10 | 5.1 | 2994 | cohesive | 43 | cohesive |
| E-16 | P2-17 | 30 | 4.5 | 2-OA/AA | 90/10 | 4.6 | ≥10000 |  | 1683 | cohesive |
| E-17 | P2-18 | 30 | 7.5 | 2-OA/AA | 90/10 | 2.9 | ≥10000 |  | 1145 | cohesive |
| E-18 | P2-17 | 10 | 1.5 | 2-OA/AA | 90/10 | 7.7 | 2440 | cohesive | 72 | cohesive |
| E-19 | P2-18 | 10 | 2.5 | 2-OA/AA | 90/10 | 7.1 | 7874 | cohesive | 355 | cohesive |
| E-20 | P2-16 | 25 | 1.25 | 2-EHA/AA | 95/5 | 6.2 | 114 | cohesive | 17 | cohesive |
| E-21 | P2-19 | 25 | 2.5 | 2-EHA/AA | 95/5 | 5.8 | 2318 | cohesive | 143 | cohesive |
| E-22 | P2-20 | 25 | 5 | 2-EHA/AA | 95/5 | 5.0 | 7806 | cohesive | 646 | cohesive |
| E-23 | P2-21 | 25 | 7.5 | 2-EHA/AA | 95/5 | 4.1 | ≥10000 | cohesive | 2023 | cohesive |
| E-24 | P2-22 | 25 | 1.25 | 2-EHA/AA | 95/5 | 6.0 | 127 | cohesive | 10 | cohesive |
| E-25 | P2-23 | 25 | 2.5 | 2-EHA/AA | 95/5 | 5.8 | 1189 | cohesive | 109 | cohesive |
| E-26 | P2-24 | 25 | 5 | 2-EHA/AA | 95/5 | 4.6 | 4993 | cohesive | 573 | cohesive |
| E-27 | P2-26 | 25 | 7.5 | 2-EHA/AA | 95/5 | 4.2 | ≥10000 |  | 1378 | cohesive |
| C-6 |  | 20 | 0 | 2-EHA/AA | 95/5 | 7.2 | 25 | cohesive | 3 | cohesive |
| E-28 | P2-27 | 40 | 2 | 2-EHA/AA | 95/5 | 6.2 | 809 | cohesive | 61 | cohesive |
| E-29 | P2-28 | 30 | 1.5 | 2-EHA/AA | 95/5 | 6.2 | 1095 | cohesive | 78 | cohesive |
| E-30 | P2-29 | 30 | 3.75 | 2-EHAMA | 95/5 | 6.0 | 8703 | cohesive | 524 | cohesive |
| E-31 | P2-29 | 33 | 4.125 | 2-EHA/AA | 95 5 | 5.2 | ≥10000 |  | 1943 | cohesive |
| E-32 | P2-30 | 30 | 3.75 | 2-EHA/AA | 95/5 | 4.9 | ≥10000 |  | 1617 | cohesive |
| E-33 | P2-31 | 30 | 6 | 2-EHA/AA | 95/5 | 4.4 | 6096 | cohesive | 797 | cohesive |
| E-34 | P2-33 | 25 | 1 25 | 2-EHA/AA | 95/5 | 5.8 | 61 | cohesive | 3 | cohesive |
| E-35 | P2-34 | 25 | 2.5 | 2-EHA/AA | 95/5 | 5.6 | 84 | cohesive | 8 | cohesive |
| E-36 | P2-35 | 25 | 5 | 2-EHA/AA | 95/5 | 5.2 | 213 | cohesive | 28 | cohesive |
| E-37 | P2-36 | 25 | 7.5 | 2-EHA/AA | 95/5 | 5.4 | 92 | cohesive | 11 | cohesive |

TABLE 11-continued

| ID | Polymer2 | Polymer2, % | Overall Mac, % | Polymer1 components | Polymer1 component Ratios | 180° Peel Adhesion, N/cm | Shear (23° C.), min | Shear Failure mode (23° C.) | Shear (70° C.), min | Shear Failure mode 70° C. |
|---|---|---|---|---|---|---|---|---|---|---|
| E-38 | P2-37 | 30 | 3.75 | 2-EHA/AA | 95/5 | 4.9 | 643 | cohesive | 67 | cohesive |
| E-39 | P2-41 | 20 | 5.02 | 2-EHA/AA | 95/5 | 4.4 | 1256 | cohesive | 137 | cohesive |
| E-40 | P2-44 | 30 | 0.9 | 2-EHA/AA | 95/5 |  | 1789 | cohesive |  |  |
| E-41 | P2-45 | 30 | 7.5 | 2-EHA/AA | 95/5 |  | 7084 | cohesive | 776 | cohesive |

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. An adhesive composition comprising:
   at least one first acrylic polymer prepared by free-radical polymerization of first components comprising:
   i) at least one alkyl (meth)acrylate having from 4 to 22 carbon atoms; and
   ii) at least one of acrylic acid and methacrylic acid;
   at least one second acrylic polymer prepared by free-radical polymerization of second components comprising:
   iii) at least one alkyl (meth)acrylate having from 4 to 22 carbon atoms;
   iv) at least one (meth)acrylamide represented by the formula

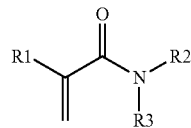

wherein $R^1$ is H or methyl; and
   $R^2$ and $R^3$ independently represents H or an alkyl group having from 1 to 8 carbon atoms, or taken together $R^2$ and $R^3$ may form a divalent alkylene group having from 4 to 6 carbon atoms; and
   v) at least one high $T_g$ macromer having a terminal free-radically polymerizable unsaturated group, wherein the high $T_g$ macromer has a $T_g$ of at least 45° C.,
   wherein based on the combined total weight of the at least one first acrylic polymer and the at least one second acrylic polymer, the at least one second acrylic polymer is present at a level of from 5 to 40 percent by weight, and wherein based on the combined total weight of the at least one first acrylic polymer and the at least one second acrylic polymer, the second acrylic polymer comprises from 5 to 40 percent by weight.

2. The adhesive composition of claim 1, wherein the high $T_g$ macromer has a $T_g$ of at least 80° C.

3. The adhesive composition of claim 1, wherein the at least one high $T_g$ macromer comprises a polymethyl methacrylate macromer having a terminal free-radically polymerizable unsaturated group.

4. The adhesive composition of claim 1, wherein based on the total weight of components i) and ii), the first acrylic polymer comprises:
   85 to 99 percent by weight of first component i); and
   1 to 15 percent by weight of first component ii).

5. The adhesive composition of claim 1, wherein based on the total weight of the components iii), iv), and v), the second acrylic polymer comprises:
   30 to 94 percent by weight of second component iii);
   1 to 10 percent by weight of second component iv); and
   5 to 60 percent by weight of second component v).

6. The adhesive composition of claim 1, wherein based on the total weight of the first and second acrylic polymers, the macromer comprises from 1 to 15 percent by weight of the total weight of the first and second acrylic polymers.

* * * * *

UNITED STATES PATENT AND TRADEMARK OFFICE
CERTIFICATE OF CORRECTION

PATENT NO. : 9,701,875 B1
APPLICATION NO. : 14/981122
DATED : July 11, 2017
INVENTOR(S) : David Yarusso Page 1 of 1

It is certified that error appears in the above-identified patent and that said Letters Patent is hereby corrected as shown below:

Column 4
Line 31 (First Occurrence), Delete "T" and insert -- $T_g$ --, therefor.
Line 31 (Second Occurrence), Delete "T" and insert -- $T_g$ --, therefor.
Line 51, Delete "calorimetry" and insert -- Calorimetry --, therefor.
Line 55, Delete "calorimetry"." and insert -- Calorimetry". --, therefor.

Column 17
Line 62, Delete "T" and insert -- $T_g$ --, therefor.

Column 19
Line 41 (Approx.), Delete "T" and insert -- $T_g$ --, therefor.
Line 45 (Approx.), Delete "T" and insert -- $T_g$ --, therefor.

Column 22
Line 52, Delete "p.m." and insert -- μm. --, therefor.

Columns 23-24
Line 22 (Approx.), Delete "7 5" and insert -- 7.5 --, therefor.
Line 24 (Approx.), Delete "3 75" and insert -- 3.75 --, therefor.
Line 39 (Approx.), Delete "1.25" and insert -- 12.5 --, therefor.
Line 45 (Approx.), Delete "2-EHAMA" and insert -- 2-EHA/AA --, therefor.
Line 49 (Approx.), Delete "15" and insert -- 1.5 --, therefor.
Line 63 (Approx.), Delete "809" and insert -- 899 --, therefor.
Line 64 (Approx.), Delete "1095" and insert -- 1995 --, therefor.
Line 65 (Approx.), Delete "2-EHAMA" and insert -- 2-EHA/AA --, therefor.
Line 66 (Approx.), Delete "95 5" and insert -- 95/5 --, therefor.
Line 69 (Approx.), Delete "1 25" and insert -- 1.25 --, therefor.

Signed and Sealed this
Tenth Day of April, 2018

Andrei Iancu
*Director of the United States Patent and Trademark Office*